Oct. 16, 1956 T. SLONCZEWSKI 2,767,374

HETERODYNE MEASURING CIRCUITS

Filed Dec. 12, 1951

INVENTOR
T. SLONCZEWSKI

BY H. A. Burgess
ATTORNEY

United States Patent Office 2,767,374

Patented Oct. 16, 1956

2,767,374

HETERODYNE MEASURING CIRCUITS

Thaddeus Slonczewski, Summit, N. J., assignor to Bell Telephone Laboratories, Incorporated, New York, N. Y., a corporation of New York Application December 12, 1951, Serial No. 261,223

6 Claims. (Cl. 324—57)

This invention relates to frequency translation systems and particularly to compensation for non-linear distortion arising in such systems.

An object of the invention is to compensate for non-linear distortion in a detector or modulator.

A further object of the invention is to compensate in one stage of modulation for errors arising in another stage of modulation.

A further object is to increase accuracy of measurement at high frequencies by making linear translation of gain or loss from high to low frequency.

In prior art measuring systems it has been common to measure the gain or loss introduced by a circuit element in a high frequency system by stepping the frequencies down to a lower level where measurement is more convenient and to evaluate such gain or loss in terms of an equivalent gain or loss at the lower frequency. The accuracy of this method is dependent upon the linearity of the detector used to step the frequency down to the lower level. If there is non-linearity in the detecting process, the measured values obtained in the low frequency part of the system will not be exactly in proportion to the gain or loss introduced into the high frequency part of the system.

In the system disclosed herein, in accordance with the invention, non-linear distortion in the heterodyne detector is compensated by applying the output therefrom to the input of a further tube acting as a modulator and amplifier and controlling the amplitude and phase of different frequency components of the waves applied to the modulator to produce a corrective effect which results in final output currents more nearly strictly proportional to the current amplitudes existing in the high frequency part of the system.

The invention together with its objects and features, will be more fully understood from the following detailed description and the accompanying drawings in which.

Figure 1:
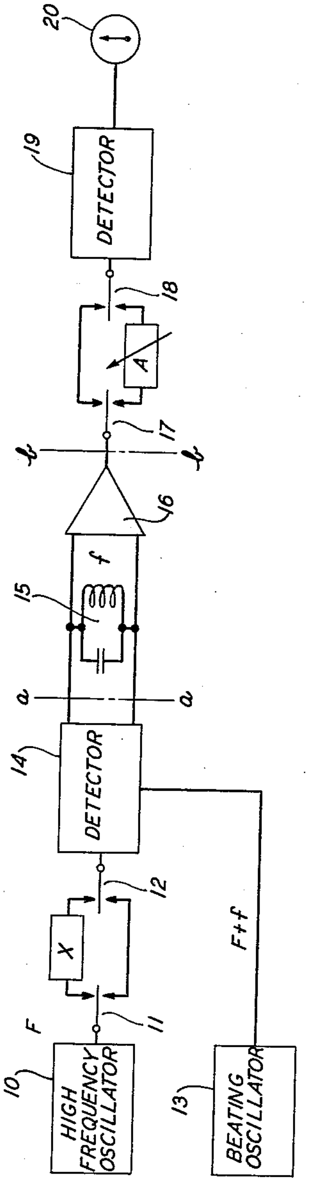
Fig. 1 is a simplified block schematic diagram of a prior art circuit.

Referring to the prior art circuit of Fig. 1, it is assumed that the value of an unknown circuit element *x* is to be determined, *x* being typically a loss such as a network or device having an over-all net attenuation, or contrariwise being a device or element having gain. It is assumed that the element *x* is designed or intended for use at some high frequency and that it is desired to measure its gain or loss for high frequency waves by conducting the measurements at some convenient relatively low frequency. High frequency waves of constant peak amplitude, and frequency *f*, are supplied by the high frequency oscillator 10 and can be sent either through the element *x* or around it by closing the switches 11, 12 to their upper contacts or lower contacts, respectively. Beating oscillations of frequency $F+f$, are supplied by source 13 to heterodyne detector 14 to which switch 12 also is connected. The detected waves of frequency *f* are impressed on amplifier 16 having its input tuned to frequency *f* by filter 15.

The output of amplifier 16 can be sent through the measuring device A or around it by switches 17 and 18 when closed to their lower or upper contacts respectively. Switch 18 is connected to detector 19 followed by meter 20.

If elements X and A are both loss elements, A being known and adjustable, X can be measured by obtaining the same reading on meter 20 when switches 11, 12 and 17, 18 are first in their upper and then in their lower positions. The element X is then equal in attenuation to A, provided the circuit between X and A is linear. Methods are known for making amplifier 16 sufficiently linear, so that linearity of the circuit is practically a question of linearity of detector 14.

It is assumed that detector 14 is a square-law detector which means that the output current is expressible in terms of the square of the sum of the two input voltages. The amplitude of the component of frequency *f* is determined by the product term $2e_1e_2$, where $e_1$ and $e_2$ respectively represent the voltages of the waves of frequencies F and $F+f$ from sources 10 and 13 respectively. If the detector is a truly square-law device, the output current is accurately represented by the square of the applied voltage and the output component *f* is strictly proportional to the product of the input voltages. In practice this is not the case since the detector is not strictly a square law device, so that the equation representing output current is found to contain higher even order terms than the square term, for example fourth order or sixth order terms, or higher, although these are usually relatively very small. These higher order terms also contribute some output current of frequency *f*, which adds algebraically to the output component of frequency *f* resulting from the square or second order relation. The effect is to make the wanted output current of frequency *f* depart from the value which it would have if the detector 14 were a strictly square-law detector.

In practice the fourth order modulation will be larger than the sixth or higher orders and may be assumed for illustration to be the chief cause of the error referred to in size of the component *f*. The fourth order modulation also gives rise to a current of frequency 2*f* as a result of interaction between double frequency components, the relation being of the form $2(F+f)-2F=2f$. The amount of current of frequency 2*f* appearing in the detector output can be taken, therefore, as a measure of the amount of fourth order modulation occurring in the detector 14.

The invention takes advantage of this fact by selecting the current of frequency 2*f* in the detector output and utilizing this to apply a correction to the wanted output component of frequency *f*.

Figure 2:
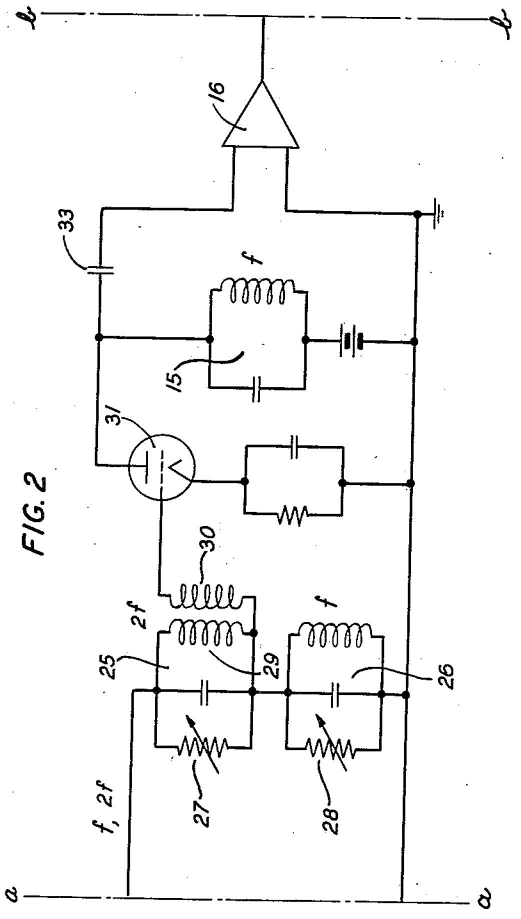
Fig. 2 is a schematic circuit diagram of the improvement to be introduced into the circuit of Fig. 1 according to the invention by substituting the Fig. 2 part for the part between broken lines *a—a* and *b—b* of Fig. 1.

For this purpose, referring to Fig. 2, there are provided two selective or filtering circuits 25 and 26 in the output of detector 14, tuned respectively to 2*f* and *f*. The voltages developed across these tuned circuits are applied to the grid of modulator tube 31. The direction or sign of the 2*f* voltage is determined by the direction of winding of the transformer 29, 30, and the voltage of each frequency developed across its tuned circuit is controlled by the resistors 27 and 28, respectively, shown as adjustable.

In operation, if the detector 14 is not strictly a square-law device but has some fourth order modulation, this results in an error in the magnitude of current of the wanted frequency *f*, and it also results in production of current of frequency 2*f* in an amount proportional to this error. The resistances 27 and 28 and the windings 29 and 30 are proportioned and connected so as to impress on the grid of tube 31 just the right amount of both the *f* and 2*f* components to bring the output current of frequency $f$ of tube 31 to the correct magnitude. Tube 31 is a modulator having both a first order and second order term. By virtue of the first order term, tube 31 repeats the input waves of frequencies $f$ and $2f$ into its output. The second order term results in production of a current of frequency $f$ due to interaction between input components of frequencies $2f$ and $f$, in the relation $2f-f=f$. This latter component combines with the principal output component of frequency $f$ to modify the size of the latter in proportion to the amount of fourth order modulation occurring in detector 14 as measured by the size of the component $2f$.

The filter 15 in the output of tube 31 suppresses all waves of higher frequency than the wanted frequency $f$ and passes the wave of frequency $f$ through series condenser 33 to the input of amplifier 16.

The behavior of the detector 14 and modulator 31 as outlined above in producing the various frequency components can be demonstrated by well-known relationships between input voltages and output currents in vacuum tube circuits.

If detector 14 had a perfectly square-law characteristic its output current component $i$ of frequency $f$ would be $$i=a_2E \cos pt$$

E being the amplitude of the impressed sine wave voltage of frequency F, the voltage of the beating oscillator 13 being constant and representable as unity for simplicity. As usual $p=2\pi f$ and $a_2$ is a tube parameter.

The presence of fourth order modulation in detector 14 causes the output current of the wanted frequency $f$ to be $$i'=[a_2E+a_4E^3] \cos pt$$

where the term $a_4E^3$ represents the small amount of current of frequency $f$ due to the fourth order term, $a_4$ being a tube parameter.

The same fourth order term results in the production of output current of frequency $2f$ this having the value $$i''=a_4E^2 \cos 2pt$$

These currents are selected from higher frequency currents of no present interest by use of filters 25 and 26 and the voltages developed in these filters are impressed on the grid of modulator 31. This tube has a characteristic of the form $$i_{31}=gv+av^2$$

where $v$ is the sum of the voltages from filters 25 and 26, these corresponding in form to the right-hand sides of the expressions for currents $i'$ and $i''$ given above. Thus $$i_{31}=g\left[R_{26}(a_2E+a_4E^3)\cos pt-\frac{R_{25}}{2}a_4E^2\cos 2pt\right]+ a\left[R_{26}(a_2E+a_4E^3)\cos pt-\frac{R_{25}}{2}a_4E^2\cos 2pt\right]^2$$

where R is the resistance value of the filters 25 and 26 (including resistors 27 and 28) as the case may be.

The current $i_{31}$ has many components all of which are eliminated by filter 15 except the current component of frequency $f$ which is represented by $$I_f=R_{26}ga_2E+R_{26}ga_4E^3-\frac{R_{26}R_{25}}{2}aa_2a_4E^3-\frac{R_{26}R_{25}}{2}aa_4^2E^5$$

The last term can be shown to be negligibly small.

The second and third terms will cancel each other if $a$ and $g$ are adjusted so that $$g=\frac{R_{25}}{2}aa_2$$

which can be done by proper adjustment of the bias voltage on tube 31.

The remaining term $R_{26}ga_2E$ is linear in E and constitutes the desired current of frequency $f$ corrected for lack of linearity of detector 14.

The invention is not restricted in its scope to the correction of fourth order modulation. If, after the fourth order correction is made, a sixth order non-linearity $a_6E^5$ appears it may be corrected in the same manner as above by modulating the fourth harmonic of amplitude $a_6E^3$ against the second harmonic of the modulator output of amplitude $E^2$ which in turn is produced by squaring the output of the modulator of amplitude E. Still higher orders of modulation can be treated in a similar manner.

What is claimed is:

1. In combination a detector, connections for applying to said detector input waves differing in frequency by $f$ whereby output currents of frequency $f$ are produced, said detector having the property of producing fourth order modulation components, means to select output currents having frequencies $f$ and $2f$ respectively, a modulator whose output contains first order and second order products of applied input waves connected in tandem following said detector, means to apply to said modulator as input waves therefor substantially solely the output waves of frequencies $f$ and $2f$ from said detector, means to proportion the relative amplitudes of said modulator input waves to the values which give a modulator output current of frequency $f$ substantially free from fourth order modulation products of frequency $f$ originating in said detector.

2. A circuit for compensating small amounts of distortion in the output of a square-law detector due to presence of some fourth-order modulation in the detector at the wanted frequency of the detector, said circuit comprising a modulator having a square-law characteristic, means in the output of said detector for selecting currents of the wanted frequency and currents of twice the wanted frequency, from the current components of all other frequencies in the output of the detector, means for selectively impressing substantially only said selected currents on the input circuit of said modulator, and means to proportion the relative amplitudes of the selected currents to such values as substantially to cancel in the output currents of the modulator said small amounts of distortion.

3. In a measuring circuit, a first high frequency generator, a second high frequency generator of slightly different frequency, a detector having its input coupled to both generators and producing in its output circuit the low difference-frequency wave, means to vary the amount of loss included between the first generator and said detector, said detector having a nominally square-law characteristic, filter means in the detector output for selecting the difference frequency wave and waves of twice the difference frequency and for suppressing waves of all other frequencies, a modulator having a nominally square-law characteristic, means including phase reversing means located between the detector and the modulator to impress on the input of said modulator said selected waves in proper phase and proportion to produce current in the output of said modulator having said difference frequency and having its amplitude compensated for error arising from slight departure of said detector characteristic from true parabolic form, and an indicator coupled to said modulator output.

4. In a measuring system in which loss at high frequency is translated into equivalent loss at a low frequency by use of a heterodyne detector, means for compensating non-linearity in the translation comprising a modulator stage coming after the detector, filter means for selecting said low frequency and twice said low frequency components in the output of said detector means to impress on the input of said modulator the said low frequency and double frequency output components, said last means including means to exclude substantially all other frequencies and means to proportion the relative amplitude and phases of said two components of respective frequencies to produce in said modulator a distortion of a sign and magnitude to compensate said non-linearity, and a utilization device on the output side of said modulator.

5. In a measuring circuit, two distorting stages in tandem for translating a wave of frequency $f$, interstage connecting means between said two stages and in tandem therewith, said interstage connecting means including means for selecting substantially only said wave and a distortion component of frequency $2f$ from the output of a first one of said stages, and for impressing said wave and distortion component on the input of a second one of said stages, said interstage connecting means also including means for effecting a phase reversal of said distortion component only, whereby deviations of the translation constant of said first stage for said wave are compensated for in said second stage.

6. In a difference-frequency generating system, a translating stage subject to non-linearity of response due to modulation of fourth order, said stage having a square-law parameter $a_2$, a substantially square-law modulating stage following said translating stage in tandem relationship thereto, said modulating stage having a characteristic of the form $$i=gv+av^2$$

where $i$ is the output current, $v$ is the impressed input voltage and $g$ and $a$ are first and second order parameters respectively, interstage connecting means between said two stages including means for selecting the difference-frequency output wave of said translating stage together with a distortion component from said generating stage at double the difference frequency, and connecting means including means for impressing substantially only said two selected components upon said modulating stage with a phase reversal of said double frequency component only, said interstage coupling means and said connected stages being interrelated substantially according to the formula $$g=\frac{R_{25}}{2}aa_2$$

where $R_{25}$ is the resistance of the interstage coupling means to the said double frequency component, whereby the output of the said modulating stage constitutes a substantially linear response by the system as a whole.

References Cited in the file of this patent

UNITED STATES PATENTS

| | | |
|---|---|---|
| 2,047,782 | Jensen | July 14, 1936 |
| 2,054,431 | Lindenblad | Sept. 15, 1936 |
| 2,191,454 | Craft | Feb. 27, 1940 |
| 2,233,061 | Peterson | Feb. 25, 1941 |
| 2,310,260 | Schock | Feb. 9, 1943 |